(12) United States Patent
Yano et al.

(10) Patent No.: US 6,256,023 B1
(45) Date of Patent: Jul. 3, 2001

(54) COORDINATE INPUT DEVICE FOR ACCURATE DETECTION OF COORDINATES OF A POINT ON A WRITING PANEL HAVING AN INCREASED SIZE

(75) Inventors: Takashi Yano, Tokyo; Makoto Tanaka; Kunikazu Tsuda, both of Kanagawa, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/111,129

(22) Filed: Jul. 6, 1998

(30) Foreign Application Priority Data

Jul. 11, 1997 (JP) .................................................. 9-186118

(51) Int. Cl.[7] .................................................. G09G 5/00
(52) U.S. Cl. ............................................................ 345/177
(58) Field of Search ........................ 178/18; 345/176–178

(56) References Cited

U.S. PATENT DOCUMENTS

| | | | |
|---|---|---|---|
| 4,859,996 | * 8/1989 | Adler et al. | 340/712 |
| 4,880,665 | * 11/1989 | Adler et al. | 427/126.3 |
| 5,162,618 | * 11/1992 | Knowles | 178/18 |
| 5,260,521 | * 11/1993 | Knowles | 178/18 |
| 5,329,070 | * 7/1994 | Knowles | 178/18 |
| 5,451,723 | * 9/1995 | Huang et al. | 178/18 |
| 5,573,077 | * 11/1996 | Knowles | 178/19 |
| 5,591,945 | * 1/1997 | Kent | 178/19 |
| 5,739,479 | * 4/1998 | Davis-Cannon et al. | 178/19 |
| 5,854,450 | * 12/1998 | Kent | 178/18.04 |
| 6,091,406 | * 7/2000 | Kambara et al. | 345/177 |

FOREIGN PATENT DOCUMENTS

| | | |
|---|---|---|
| 8305481 | 11/1996 | (JP) . |
| WO9623292 | 8/1996 | (WO) . |

* cited by examiner

Primary Examiner—Steven Saras
Assistant Examiner—Srilakshmi Kumar
(74) Attorney, Agent, or Firm—Cooper & Dunham LLP (57) ABSTRACT

A coordinate input device includes a writing panel which includes a writing surface having two vertical sides and two horizontal sides. A plurality of transmitting units transmit surface acoustic waves SAW to propagate the SAW within the writing panel in one of a vertical direction and a horizontal direction through reflection. A plurality of receiving units receive the SAW from the plurality of transmitting units through reflection, and output detection signals in response to the received SAW, so that coordinates of a specified point on the writing panel are detected based on the detection signals. A plurality of reflectors, provided on the four sides of the writing surface, reflect the SAW from the transmitting units inwardly to the writing panel and reflect the reflected SAW to the receiving units. In the coordinate input device, the plurality of reflectors, the plurality of transmitting units, and the plurality of receiving units are divided into at least two groups with respect to one of the vertical direction and the horizontal direction, respectively, and symmetrically placed about a predetermined line of the writing panel.

16 Claims, 7 Drawing Sheets

COORDINATE INPUT DEVICE FOR ACCURATE DETECTION OF COORDINATES OF A POINT ON A WRITING PANEL HAVING AN INCREASED SIZE

BACKGROUND OF THE INVENTION (1) Field of the Invention

The present invention relates to a coordinate input device which detects coordinates of an input image on a transparent writing panel by utilizing propagation of surface acoustic waves on the writing panel, and inputs the coordinates to an image display system so that the input image is displayed on a display screen of the image display system.

(2) Description of the Related Art

An image display system in which a coordinate input device is incorporated therein is known. In the image display system, an initial image is displayed on a display screen. For example, the coordinate input device has an image input panel, such as a touch screen, which covers a display screen of the image display system. The touch screen has a touch-sensitive transparent panel covering the display screen. The coordinate input device detects coordinates of points specified on the image input panel by an operator to form an input image, and inputs the coordinates to the image display system so that the input image and the initial image are displayed on the display screen in an overlaying manner.

Japanese Laid-Open Patent Application No. 8-305481 discloses a coordinate input device of the above type. The above-mentioned publication shows a background technology of the present invention. The coordinate input device of the above-mentioned publication utilizes propagation of surface acoustic waves (SAW) to detect coordinates of an input image on a transparent writing panel.

Figure 7:
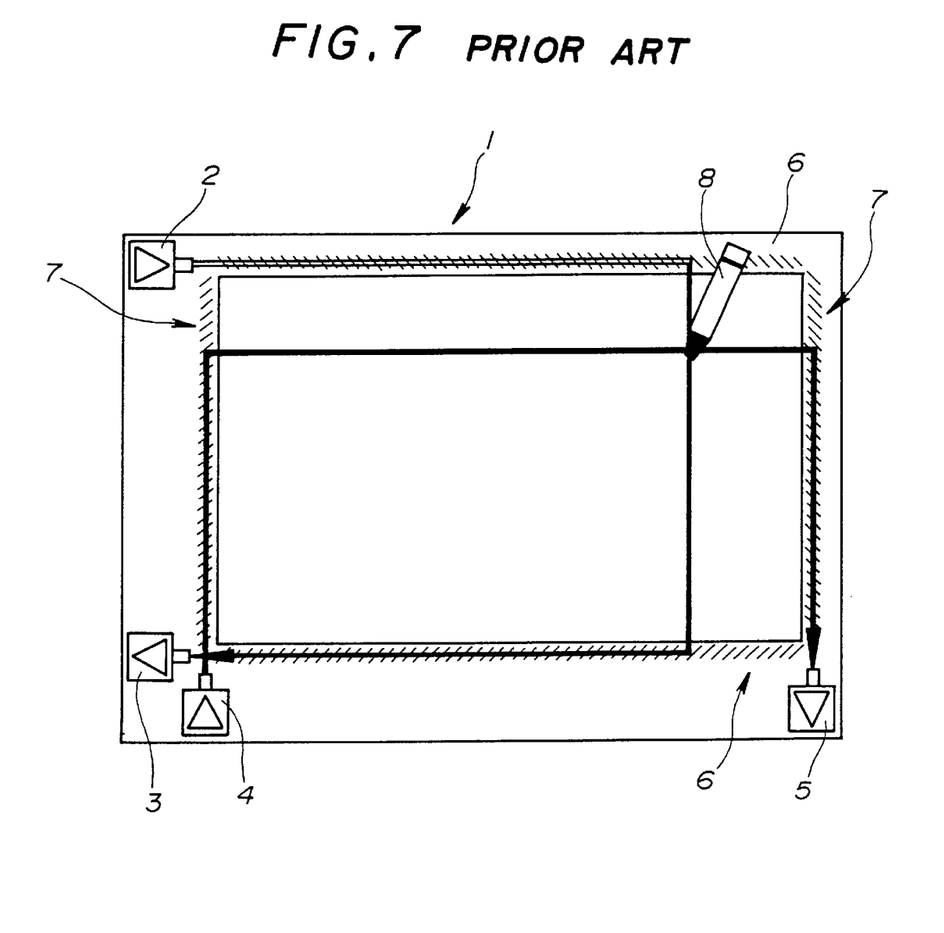
FIG. 7 is a diagram for explaining a conventional coordinate input device.

FIG. 7 shows a conventional coordinate input device as disclosed in the above-mentioned publication.

As shown in FIG. 7, the conventional coordinate input device has a transparent writing panel 1 covering a display screen of an image display system. The transparent writing panel 1 is made of glass and provided in the form of a rectangle having two vertical sides and two horizontal sides. Supposing that the writing panel 1 has an x-axis parallel to the horizontal sides and a y-axis parallel to the vertical sides, the position of a point on the writing panel 1 can be defined by a set of an x-coordinate and a y-coordinate. The x-coordinate and the y-coordinate of the point on the writing panel 1 are detected and input to the image display system by the conventional coordinate input device.

A transmitting transducer 2 and a receiving transducer 3 are provided at an upper left corner and a lower left corner of the writing panel 1 and both confront the right side of the writing panel 1. The transmitting transducer 2 transmits surface acoustic waves (SAW) in the horizontal right direction so as to propagate the SAW within the writing panel 1. The receiving transducer 3 receives the SAW from the transmitting transducer 2 through reflection.

A transmitting transducer 4 and a receiving transducer 5 are provided at a lower left corner and a lower right corner of the writing panel 1 and both confront the upper side of the writing panel 1. The transmitting transducer 4 transmits surface acoustic waves (SAW) in the vertical upper direction so as to propagate the SAW within the writing panel 1. The receiving transducer 5 receives the SAW from the transmitting transducer 4 through reflection.

In the conventional coordinate input device of FIG. 7, two arrays of reflectors 6 are provided on the horizontal sides of the writing panel 1, and the reflectors 6 are horizontally arrayed at a given angle on each horizontal side of the writing panel 1. Further, two arrays, of reflectors 7 are provided on the vertical sides of the writing panel 1, and the reflectors 7 are vertically arrayed at the given angle on each vertical side of the writing panel 1.

As shown in FIG. 7, the reflectors 6 on the upper side of the writing panel 1 partially reflect the SAW from the transmitting transducer 2 in the inward directions, and the reflectors 6 on the lower side of the writing board 1 further reflect the SAW from the upper-side reflectors 6 to the receiving transducer 3. The reflectors 7 on the left side of the writing panel 1 partially reflect the SAW from the transmitting transducer 4 in the inward directions, and the reflectors 7 on the right side of the writing panel 1 further reflect the SAW from the left-side reflectors 7 to the receiving transducer 5.

Further, in the conventional coordinate input device of FIG. 7, an input pen 8 is provided. The input pen 8 has a leading edge made of a rubber material. By pressing a specific position of the writing panel 1 with the leading edge of the input pen 8, an operator specifies a point on the writing panel 1. The SAW from the transmitting transducer 2 travel within the writing panel 1 in the y-axis direction through the reflection by one of the upper-side reflectors 6, and the receiving transducer receives the SAW from a corresponding one of the lower-side reflectors 6. The transmission and the reception of the SAW are repeated by the transducers 2 and 3 with respect to all of the reflectors 6 along the x-axis of the writing panel 1. At the same time, the SAW from the transmitting transducer 4 travel within the writing panel 1 in the x-axis direction through the reflection by one of the left-side reflectors 7, and the receiving transducer 5 receives the SAW from a corresponding one of the right-side reflectors 7. The transmission and the reception of the SAW are repeated by the transducers 4 and 5 with respect to all of the reflectors 7 along the y-axis of the writing panel 1. The propagation of the SAW within the writing panel 1 is cut off or inhibited only at the point specified by the input pen 8.

In the conventional coordinate input device of FIG. 7, the time which is taken for the SAW to travel from the transmitting transducer 2 to the receiving transducer 3 via the reflectors 6 in the writing panel 1 varies depending on the distance of each of the reflectors 6 from the left side (or the y-axis) of the writing panel 1 along the x-axis of the writing panel 1. By normalizing detection signals output by the receiving transducer 3, the distance of each of the reflectors 6 is converted into a variable in terms of time. The propagation of the SAW within the writing panel 1 is cut off or inhibited only at the point specified by the input pen 8. By locating a particular one of the reflectors 6 for which the detection signal output by the receiving transducer 3 is attenuated, the x-coordinate of the point on the writing panel 1 can be detected by the conventional coordinate input device of FIG. 7. In a similar manner, by using the transmitting transducer 4 and the receiving transducer 5, the y-coordinate of the point on the writing panel 1 can be detected.

In the conventional coordinate input device of FIG. 7, the surface acoustic waves (SAW) are periodically propagated in the x-axis direction and in the y-axis direction of the writing panel 1, in order to allow the detection of the coordinates of a point on the writing panel 1. If a writing panel with an increased size is used in the conventional coordinate input device of FIG. 7, the overall period of the propagation of the SAW may be excessively increased. It makes it difficult for the conventional coordinate input device to accurately detect the coordinates of a point specified on the increased-size writing panel by the input pen 8.

If the size of the writing panel used in the conventional coordinate input device is increased, the attenuation of the SAW propagated in the writing panel becomes considerable and the number of reflections or separations of the SAW by the reflectors 6 and 7 is increased. Hence, it is difficult for the conventional coordinate input device to use a writing panel having an increased size beyond a certain limit while allowing accurate detection of the coordinates of a point on the writing panel.

A conceivable method to eliminate the above problem of the conventional coordinate input device is that the ratio of the reflection or separation of the SAW by each of the reflectors 6 and 7 be reduced according to the increased size of the writing panel. However, when this method is used, the level of the detection signals output by the receiving transducer 3 or 5 becomes low. The SAW in one propagation path on the writing panel are easily influenced by the SAW in other propagation paths on the writing panel, and this makes the signal-to-noise (S/N) ratio lower. Hence, when the above-mentioned method is used, it is difficult for the conventional coordinate input device to use a writing panel having an increased size while allowing accurate detection of the coordinates of a point on the writing panel.

SUMMARY OF THE INVENTION

An object of the present invention is to provide an improved coordinate input device in which the above-described problems are eliminated.

Another object of the present invention is to provide a coordinate input device which provides accurate detection of coordinates of a point on a transparent writing panel even when the writing panel has an increased size, so that the coordinate input device can be suitably applied to an image display system having an increased-size display screen.

The above-mentioned objects of the present invention are achieved by a coordinate input device comprising: a writing panel which includes a writing surface having two vertical sides and two horizontal sides; a plurality of transmitting units which transmit surface acoustic waves SAW to propagate the SAW within the writing panel in one of a vertical direction and a horizontal direction through reflection; a plurality of receiving units which receive the SAW from the plurality of transmitting units through reflection, and output detection signals in response to the received SAW, so that coordinates of a specified point on the writing panel are detected based on the detection signals; and a plurality of reflectors, provided on the four sides of the writing surface, which reflect the SAW from the transmitting units inwardly to the writing panel and reflect the reflected SAW to the receiving units, wherein the plurality of reflectors, the plurality of transmitting units, and the plurality of receiving units are divided into at least two groups with respect to one of the vertical direction and the horizontal direction, respectively, and symmetrically placed about a predetermined line of the writing panel.

According to the coordinate input device of the present invention, the detection of coordinates of a point on the writing panel using the propagation of the SAW within the writing panel is accurately carried out based on the detection signals output by the plurality of receiving units. The distances of the propagation paths of the SAW in the horizontal direction and/or in the vertical direction on the writing panel needed for the detection of the coordinates are reduced even when the writing panel has an increased size. The coordinate input device of the present invention is effective in preventing the overall period of the propagation of the SAW within the writing panel from being excessively increased. Hence, even when the writing panel has an increased size, the coordinate input device of the present invention can provide accurate detection of the coordinates of the point on the writing panel.

Further, in the coordinate input device of the present invention, the plurality of reflectors include first transmitting reflectors and first receiving reflectors provided on two opposing sides of the writing surface along a first half of a length of the writing surface, and second transmitting reflectors and second receiving reflectors provided on the two opposing sides of the writing surface along a second half of the length. The plurality of transmitting units include a first transmitting unit which transmits the SAW to the first transmitting reflectors and a second transmitting unit which transmits the SAW to the second transmitting reflectors, and the plurality of receiving units include a first receiving unit which receives the SAW from the first receiving reflectors and a second receiving unit which receives the SAW from the second receiving reflectors. The first transmitting reflectors and the second transmitting reflectors are arrayed at a first supplementary angle and at a second supplementary angle, respectively, and are symmetrically placed about a center line of the writing panel, and the first receiving reflectors and the second receiving reflectors are arrayed at the second supplementary angle and at the first supplementary angle, respectively, and are symmetrically placed about the center line of the writing panel.

According to the coordinate input device of the present invention, the first transmitting reflectors and the second transmitting reflectors are symmetrically placed about a center line of the writing panel, and the first receiving reflectors and the second receiving reflectors are symmetrically placed about the center line of the writing panel. The first receiving unit does not directly receive the SAW from the second transmitting unit, and the second receiving unit does not directly receive the SAW from the first transmitting unit. Hence, the coordinate input device of the present invention is effective in preventing the S/N ratio related to the receiving units from being lowered due to the conflict between the SAW from the first transmitting unit and the SAW from the second transmitting unit.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
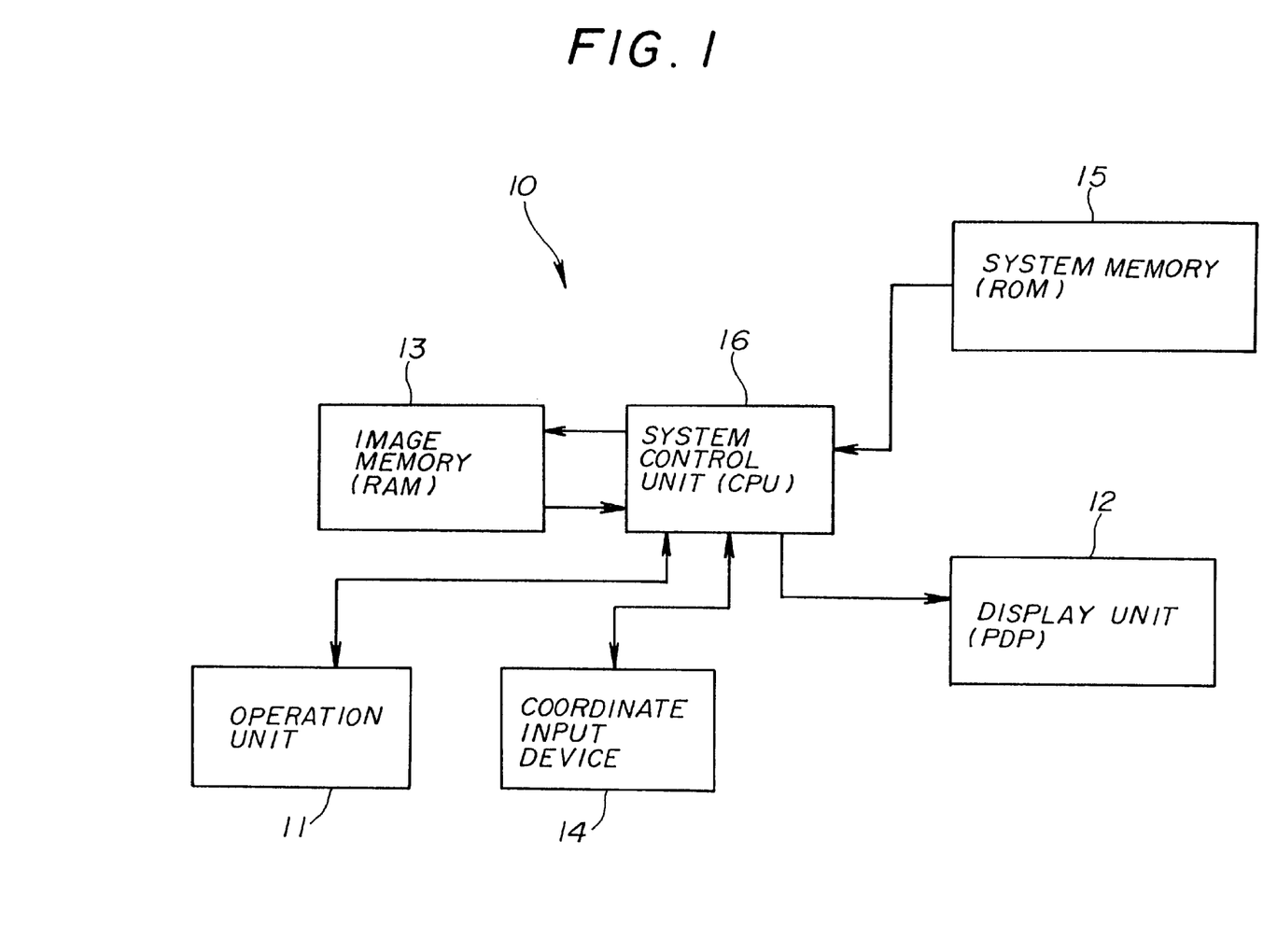
FIG. 1 is a block diagram of an image display system to which one embodiment of a coordinate input device of the present invention is applied.
Figure 2:
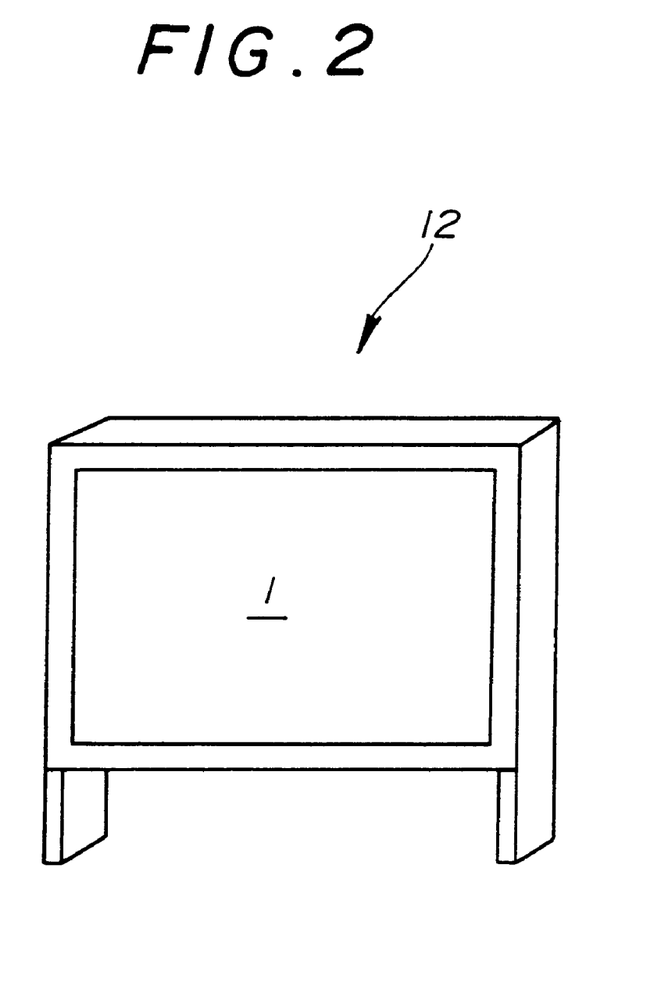
FIG. 2 is a perspective view of a display unit of the image display system.

FIG. 1 shows a configuration of an image display system to which one embodiment of a coordinate input device of the present invention is applied. FIG. 2 shows a display unit of the image display system.

According to the present invention, the image display system 10 is, as shown in FIGS. 1 and 2, configured by incorporating a coordinate input device 14 attached to a display unit 12 therein.

As shown in FIG. 1, the image display system 10 includes a system control unit 16 which controls the overall operation of the image display system 10. The system control unit 16 is constituted by a central processing unit (CPU). A system memory 15 is constituted by a read-only memory (ROM). The system memory (ROM) 15 stores a system program executed by the system control unit (CPU) 16 in order to control the overall operation of the image display system 10, and a program executed by the system control unit (CPU) 16 in order to carry out detection of coordinates of a point on the writing panel based on detection signals output by the coordinate input device of the present invention.

An operation unit 11 inputs operational conditions and/or parameters to the system control unit 16 so as to set the image display system 10 in a specified operational mode when the operation unit 11 is manipulated by an operator. The display unit 12 is a display part of the image display system 10 which displays an image on a display screen. An image memory 13 is a memory unit which stores image data indicative of the image being displayed on the display unit 12. The image memory 13 is constituted by a random access memory (RAM). The coordinate input device 14 has a transparent writing panel 1 which is essentially the same as the transparent writing panel 1 in FIG. 7, and the transparent writing panel 1 covers the display screen of the display unit 12. The coordinate input device 14 detects coordinates of points on the writing panel 1 specified by the operator to form an input image, and inputs the coordinates to the system control unit 16 so that the input image is displayed on the display screen of the display unit 12 in an overlaying manner with an initial image on the display screen.

In the image display system 10 of FIG. 1, the operation unit 11 may include a keyboard (not shown), a mouse (not shown) and an image reading device (not shown). An image to be displayed on a display screen of the image display system 10 may be selected or modified when the keyboard or the mouse is operated by the operator. Image data of an original image may be read from either a document or a magnetic disk by using the image reading device, and the original image may be displayed on the display screen based on the image data.

In the image display system 10 of FIG. 1, the display unit 12 includes a plasma display panel (PDP) having a large screen size which is larger than a normal screen size of a cathode-ray tube (CRT) monitor. The display unit 12 displays an image on the plasma display panel (PDP) based on the image data, supplied from the image memory 13 to the display unit 12 by the system control unit 16. As described above, the coordinate input device 14 is attached to the display unit 12 such that a shape of the transparent writing panel 1 is the same as a shape of the PDP of the display unit 12 as shown in FIG. 2. The coordinate input device 14 detects coordinates of a point on the writing panel 1 specified by the operator, and inputs the coordinates to the system control unit 16 so that the input image is displayed on the PDP of the display unit 12.

In the image display system 10 of FIG. 1, the image memory 13 temporarily stores image data of an original image when the image data is read from either a document or a magnetic disk by using the image reading device of the operation unit 11, and the original image is displayed on the display screen of the display unit 12 based on the image data from the image memory 13. The image memory 13 temporarily stores image data of an input image (which is formed by points specified on the writing panel 1) separately from the image data of the original image or in a synthesized form with the image data of the original image.

Figure 3:
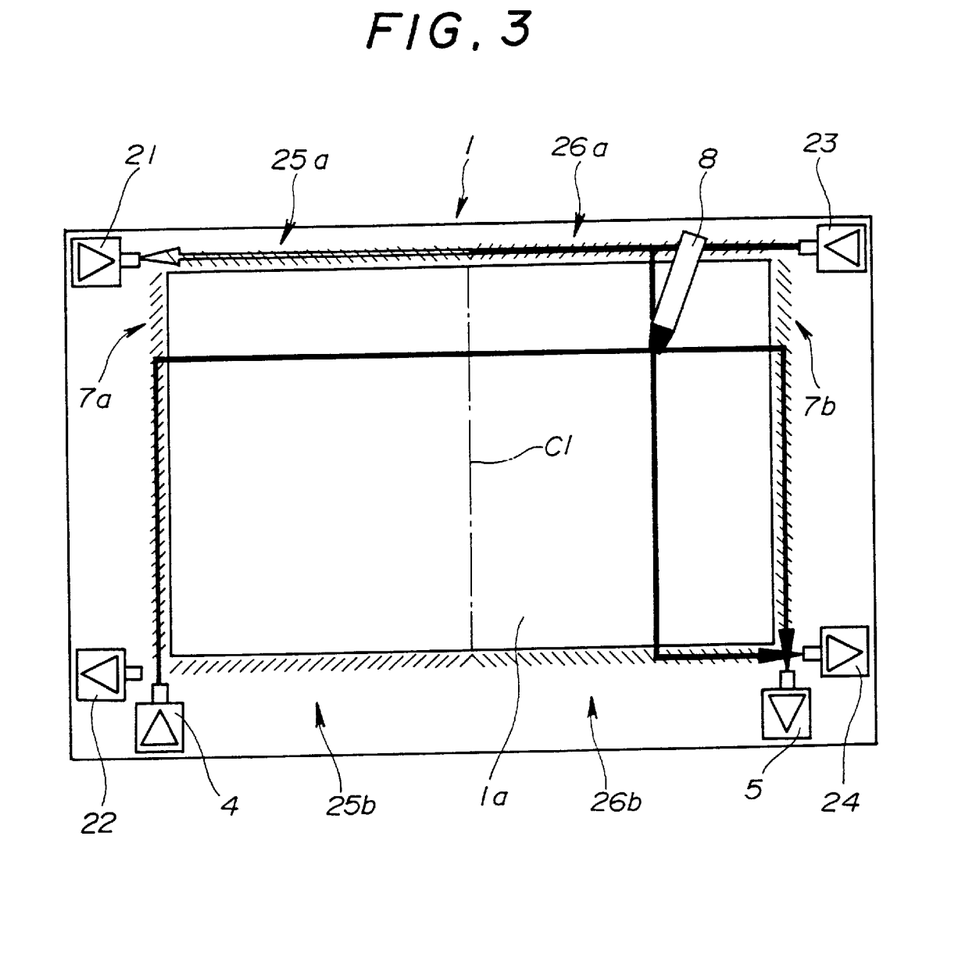
FIG. 3 is a diagram for explaining a first embodiment of the coordinate input device of the present invention.

FIG. 3 shows a first embodiment of the coordinate input device of the present invention. In FIG. 3, the elements which are the same as corresponding elements in FIG. 7 are designated by the same reference numerals and a description thereof will be omitted.

As shown in FIG. 3, the coordinate input device of the present embodiment includes the transparent writing panel 1 covering the PDP screen of the display unit 12. The transparent writing panel 1 is made of glass and has a rectangular writing surface 1a having two vertical sides and two horizontal sides. On the writing surface 1a of the writing panel 1, surface acoustic waves (SAW) are propagated. The writing panel 1 has an x-axis parallel to the horizontal sides and a y-axis parallel to the vertical sides, and the position of a point on the writing panel 1 is defined by an x-coordinate of the point along the x-axis and a y-coordinate of the point along the y-axis. The x-coordinate and the y-coordinate of the point on the writing panel 1 are detected by the coordinate input device 14, and the coordinate input device 14 inputs the coordinates to the system control unit 16 of the image display system 10.

In the coordinate input device of the present embodiment, the transmitting transducer 4, the receiving transducer 5, an array of reflectors 7a and an array of reflectors 7b are provided. The transmitting transducer 4 and the receiving transducer 5 are essentially the same as the corresponding elements 4 and 5 in FIG. 7. The array of reflectors 7a and the array of reflectors 7b are essentially the same as the two arrays of reflectors 7 in FIG. 7.

Specifically, in the present embodiment, the transmitting transducer 4 and the receiving transducer 5 are provided at the lower left corner and the lower right corner of the writing panel 1, and both confront the upper side of the writing surface 1a of the writing panel 1. The transmitting transducer 4 transmits the SAW in the vertical upper direction (or in the y-axis direction) on the writing surface 1a so as to propagate the SAW within the writing panel 1 through reflection. The receiving transducer 5 receives the SAW from the transmitting transducer 4 through reflection. The reflectors 7a and the reflectors 7b are provided on the left vertical side and the right vertical side of the writing surface 1a. The reflectors 7a and the reflectors 7b are vertically arrayed at a first supplementary angle of 45° and at a second supplementary angle of 135° on the two opposing sides of the writing surface 1a such that the reflectors 7a on the left side of the writing surface 1a partially reflect the SAW from the transmitting transducer 4 in the inward directions (or in the x-axis directions), and the reflectors 7b on the right side of the writing surface 1a further reflect the SAW from the reflectors 7a to the receiving transducer 5.

Hereinafter, in the coordinate input device of the present invention, the first and second supplementary angles are defined by an angle between the direction of the reflectors of interest and the x-axis of the writing panel 1, assuming that the lower horizontal side of the writing surface 1a is the x-axis of the writing panel 1 and the left vertical side of the writing surface 1a is the y-axis of the writing panel 1. Supplementary angles are two angles whose sum is 180°.

The coordinate input device of the present embodiment includes the input pen 8 which is essentially the same as the input pen 8 in FIG. 7. The leading edge of the input pen 8 is made of a rubber material. By pressing a specific location of the writing panel 1 with the leading edge of the input pen 8, the operator specifies a point on the writing panel 1. The SAW from the transmitting transducer 4 are partially reflected by one of the reflectors 7a and travel within the writing panel 1 in the x-axis direction through the reflection. The receiving transducer 5 receives the SAW through the reflection by a corresponding one of the reflectors 7b. The transmission and the reception of the SAW are sequentially repeated by the transducers 4 and 5 with respect to all of the reflectors 7a and 7b along the y-axis of the writing panel 1. The propagation of the SAW within the writing panel 1 is cut off or inhibited only at the point specified by the input pen 8 and is allowed at other locations of the writing surface 1a than the point.

By normalizing detection signals output by the receiving transducer 5 in response to the received SAW, the distance of each of the reflectors 7a from the lower side (or the x-axis) of the writing surfaces 1a is converted into a variable in terms of time. The propagation of the SAW within the writing panel 1 is cut off or inhibited only at the point specified by the input pen 8. By locating a particular one of the reflectors 7a (or the reflectors 7b) for which the detection signal output by the receiving transducer 5 is attenuated or zero, the y-coordinate of the point on the writing panel 1 can be detected.

Further, in the coordinate input device of the present embodiment, a first transmitting transducer 21, a second transmitting transducer 23, a first receiving transducer 22, a second receiving transducer 24, an array of first TX reflectors 25a, an array of first RX reflectors 25b, an array of second TX reflectors 26a and an array of second RX reflectors 26b are provided as shown in FIG. 3, instead of the transmitting transducer 2, the receiving transducer 3 and the two arrays of reflectors 6 in the conventional coordinate input device of FIG. 7.

The first transmitting transducer 21 and the first receiving transducer 22 are provided at the upper left corner and the lower left corner of the writing panel 1, respectively, and both confront the right side of the writing surface 1a. The first transmitting transducer 21 transmits the SAW in the horizontal right direction (or in the x-axis direction) so as to propagate the SAW on the writing surface 1a within the writing panel 1 through reflection. The first receiving transducer 22 receives the SAW from the first transmitting transducer 21 through reflection.

The first TX reflectors 25a and the first RX reflectors 25b are provided on the left half of the upper side of the writing surface 1a and the left half of the lower side of the writing surface 1a, respectively. The reflectors 25a and the reflectors 25b are arrayed on the left-half horizontal sides of the writing surface 1a at the second supplementary angle of 135° and at the first supplementary angle of 45°, respectively, such that the reflectors 25a partially reflect the SAW from the first transmitting transducer 21 in the inward directions (or in the y-axis directions), and the reflectors 25b further reflect the SAW from the reflectors 25a to the first receiving transducer 22.

Similarly, the second transmitting transducer 23 and the second receiving transducer 24 are provided at the upper right corner and the lower right corner of the writing panel 1, respectively, and both confront the left side of the writing surface 1a. The second transmitting transducer 23 transmits the SAW in the horizontal left direction so as to propagate the SAW on the writing surface 1a within the writing panel 1 through reflection. In the present embodiment, the transmission of the SAW in the horizontal left direction is started by the second transmitting transducer 23 simultaneously with the start of the transmission of the SAW in the horizontal right direction by the first transmitting transducer 21. The second receiving transducer 24 receives the SAW from the first transmitting transducer 23 through reflection.

The second TX reflectors 26a and the second RX reflectors 26b are provided on the right half of the upper side of the writing surface 1a and the right half of the lower side of the writing surface 1a, respectively. The reflectors 26a and the reflectors 26b are arrayed on the right-half horizontal sides of the writing surface 1a at the first supplementary angle of 45° and at the second supplementary angle of 135°, respectively, such that the reflectors 26a partially reflect the SAW from the second transmitting transducer 23 in the inward directions, and the reflectors 26b further reflect the SAW from the reflectors 26a to the second receiving transducer 24.

Accordingly, in the present embodiment, the transducers 21 and 22 with the reflectors 25a and 25b and the transducers 23 and 24 with the reflectors 26a and 26b are provided on the writing panel 1 symmetrically with respect to a vertical center line "C1" indicated by a one-dot chain line in FIG. 3.

The SAW from the first transmitting transducer 21 are partially reflected by one of the reflectors 26a and travel within the left half of the writing panel 1 in the negative y-axis direction through the reflection. The first receiving transducer 22 receives the SAW through the reflection by a corresponding one of the reflectors 25b. Similarly, the SAW from the second transmitting transducer 23 are partially reflected by one of the reflectors 26a and travel within the right half of the writing panel 1 in the negative y-axis direction through the reflection. The second receiving transducer 24 receives the SAW through the reflection by a corresponding one of the reflectors 26b. The transmission and the reception of the SAW are sequentially repeated by the transducers 21–24 with respect to all of the reflectors 25a and 26a (and the reflectors 25b and 26b) along the x-axis of the writing panel 1. The propagation of the SAW within the writing panel 1 is cut off or inhibited only at the point specified by the input pen 8 and is allowed at other locations of the writing surface 1a than the point.

By normalizing detection signals output by the first and the second receiving transducers 22 and 24 in response to the received SAW, the distance of each of the reflectors 25a from the left side of the writing surface 1a (or the distance of each of the reflectors 26a from the right side of the writing surface 1a) is converted into a variable in terms of time. The propagation of the SAW within the writing panel 1 is cut off or inhibited only at the point specified by the input pen 8. By locating a particular one of the reflectors 25b (or the reflectors 26b) for which the detection signal output by the first receiving transducer 22 (or by the second receiving transducer 24) is attenuated or zero, the x-coordinate of the point on the writing panel 1 can be detected.

Accordingly, in the coordinate input device of the present embodiment, by using the transmitting transducers 4, 21 and 23, the receiving transducers 5, 22 and 24 and the reflectors 7a, 7b, 25a, 25b, 26a and 26b, the x-coordinate and the y-coordinate of a point on the writing panel 1 specified by the input pen 8 can be detected. The system control unit (CPU) 16 of the image display system 10 displays the input image on the display unit (PDP) 12 based on the x-coordinate and the y-coordinate of the point supplied from the coordinate input device of the present embodiment. It is possible for the coordinate input device of the present embodiment to provide accurate detection of the coordinates of the point on the writing panel 1 even when the writing panel 1 has an increased size, so that the coordinate input device can be suitably applied to the image display system 10 having the large-size display screen (PDP).

In the above-described embodiment, the detection of the x-coordinate of a point on the writing panel 1 based on the propagation of the SAW within the writing panel 1 is carried out based on both the detection signal of the first receiving transducer 22 related to the left half of the writing panel 1 and the detection signal of the second receiving transducer 24 related to the right half of the writing panel 1. The propagation paths of the SAW in the x-axis directions on the writing panel 1 in order for the detection of the x-coordinate of the point are reduced so as to be less than half of the horizontal width of the writing panel 1. The coordinate input device of the present embodiment is effective in preventing the overall period of the propagation of the SAW within the writing panel 1 from being excessively increased. Hence, even when the writing panel 1 has an increased size, the coordinate input device of the present embodiment can provide accurate detection of the x-coordinate and the y-coordinate of the point on the writing panel 1 by using the transmitting transducers 4, 21 and 23, the receiving transducers 5, 22 and 24 and the reflectors 7a, 7b, 25a, 25b, 26a and 26b.

In the above-described embodiment, the reflectors 25a and the reflectors 26a are symmetrically placed about the vertical center line C1 of the writing panel 1, the former at the second supplementary angle of 135° and the latter at the first supplementary angle of 45°, and the reflectors 25b and the reflectors 26b are symmetrically placed about the vertical center line C1 of the writing panel 1, the former at the first supplementary angle of 45° and the latter at the second supplementary angle of 135°. The first receiving transducer 22 does not directly receive the SAW from the second transmitting transducer 23, and the second receiving transducer 24 does not directly receive the SAW from the first transmitting transducer 21. Hence, the coordinate input device of the present embodiment is effective in preventing the S/N ratio related to the receiving transducers 22 and 24 from being lowered due to the conflict between the SAW from the transducer 21 and the SAW from the transducer 23.

In the above-described embodiment, the reflectors 7a, 7b, 25a, 25b, 26a and 26b with the enlarged sizes are shown in FIG. 3 for the sake of convenience of illustration. Practically, the reflectors 7a, 7b, 25a, 25b, 26a and 26b of the coordinate input device 14 are provided in accordance with a given resolution of the input image on the writing panel 1 such that they correspond to the picture elements of the input image on the writing panel 1 which are capable of being detected by the coordinate input device 14.

Figure 4:
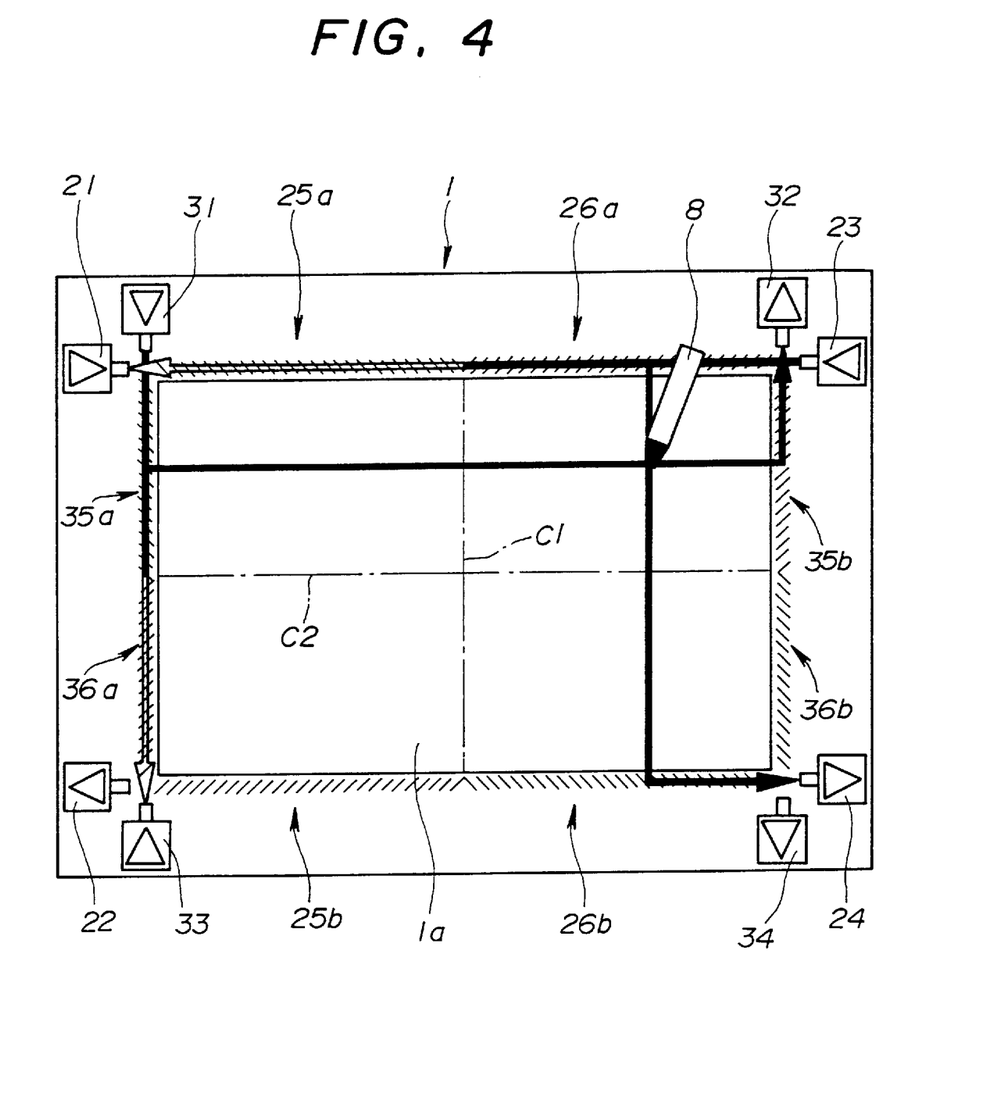
FIG. 4 is a diagram for explaining a second embodiment of the coordinate input device of the present invention.

Next, FIG. 4 shows a second embodiment of the coordinate input device of the present invention. In FIG. 4, the elements which are the same as corresponding elements in FIG. 3 are designated by the same reference numerals, and a description thereof will be omitted.

Similar to the embodiment of FIG. 3, the coordinate input device of the present embodiment is incorporated into the image display system 10 as shown in FIGS. 1 and 2, and the image display system 10 is configured with the coordinate input device of the present embodiment attached to the display unit 12.

As shown in FIG. 4, in the coordinate input device of the present embodiment, the first transmitting transducer 21, the second transmitting transducer 23, the first receiving transducer 22, the second receiving transducer 24, the first TX reflectors 25a, the first RX reflectors 25b, the second TX reflectors 26a and the second RX reflectors 26b are provided. The elements 21–24 and 25a, 25b, 26a and 26b of the present embodiment are essentially the same as corresponding elements of the previous embodiment of FIG. 3, and a description thereof will be omitted.

Further, in the coordinate input device of the present embodiment, as shown in FIG. 4, a third transmitting transducer 31, a fourth transmitting transducer 33, a third receiving transducer 32, a fourth receiving transducer 34, an array of third TX reflectors 35a, an array of third RX reflectors 35b, an array of fourth TX reflectors 36a and an array of fourth RX reflectors 36b are provided instead of the elements 4, 5, 7a and 7b of the previous embodiment of FIG. 3.

As shown in FIG. 4, in the present embodiment, the third transmitting transducer 31 and the third receiving transducer 32 are provided at the upper left corner and the upper right corner of the writing panel 1, respectively, and both confront the lower side of the writing surface 1a. The third transmitting transducer 31 transmits the SAW in the downward vertical direction so as to propagate the SAW on the writing surface 1a within the writing panel 1 through reflection. The third receiving transducer 32 receives the SAW from the transducer 31 through reflection.

The third TX reflectors 35a and the third RX reflectors 35b are provided on the upper half of the left side of the writing surface 1a and the upper half of the right side of the writing surface 1a, respectively. The reflectors 35a and the reflectors 35b are arrayed on the upper-half vertical sides of the writing surface 1a at the second supplementary angle of 135° and at the first supplementary angle of 45°, respectively, such that the reflectors 35a partially reflect the SAW from the third transmitting transducer 31 in the inward directions (or in the x-axis directions), and the reflectors 35b further reflect the SAW from the reflectors 35a to the third receiving transducer 32.

Similarly, the fourth transmitting transducer 33 and the fourth receiving transducer 34 are provided at the lower left corner and the lower right corner of the writing panel 1, respectively, and both confront the upper side of the writing surface 1a. The fourth transmitting transducer 33 transmits the SAW in the upward vertical direction (or in the y-axis direction) so as to propagate the SAW on the writing surface 1a within the writing panel 1 through reflection. In the present embodiment, the transmission of the SAW in the upward vertical direction is started by the fourth transmitting transducer 33 simultaneously with the start of the transmission of the SAW in the downward vertical direction by the third transmitting transducer 31. The fourth receiving transducer 34 receives the SAW from the transducer 33 through reflection.

The fourth TX reflectors 36a and the fourth RX reflectors 36b are provided on the lower half of the left side of the writing surface 1a and the lower half of the right side of the writing surface 1a, respectively. The reflectors 36a and the reflectors 36b are arrayed on the lower-half vertical sides of the writing surface 1a at the first supplementary angle of 45° and at the second supplementary angle of 135°, respectively, such that the reflectors 36a partially reflect the SAW from the fourth transmitting transducer 33 in the inward directions, and the reflectors 36b further reflect the SAW from the reflectors 36a to the fourth receiving transducer 34.

In the present embodiment, the transducers 21 and 22 with the reflectors 25a and 25b and the transducers 23 and 24 with the reflectors 26a and 26b are provided on the writing panel 1 symmetrically with respect to a vertical center line "C1" indicated by a one-dot chain line in FIG. 4, whereas the transducers 31 and 32 with the reflectors 35a and 35b and the transducers 33 and 34 with the reflectors 36a and 36b are provided on the writing panel 1 symmetrically with respect to a horizontal center line "C2" indicated by a one-dot chain line in FIG. 4.

The SAW from the third transmitting transducer 31 are partially reflected by one of the reflectors 35a and travel within the upper half of the writing panel 1 in the x-axis direction through the reflection. The third receiving transducer 32 receives the SAW through the reflection by a corresponding one of the reflectors 35b. Similarly, the SAW from the fourth transmitting transducer 33 are partially reflected by one of the reflectors 36a and travel within the lower half of the writing panel 1 in the x-axis direction through the reflection. The fourth receiving transducer 34 receives the SAW through the reflection by a corresponding one of the reflectors 36b. The transmission and the reception of the SAW are sequentially repeated by the transducers 31–34 with respect to all of the reflectors 35a and 36a (and the reflectors 35b and 36b) along the y-axis of the writing panel 1. The propagation of the SAW within the writing panel 1 is cut off or inhibited only at a point specified by the input pen 8 and is allowed at other locations of the writing surface 1a than the point.

By normalizing detection signals output by the third and the fourth receiving transducers 32 and 34 in response to the received SAW, the distance of each of the reflectors 35a from the upper side of the writing surface 1a (or the distance of each of the reflectors 36a from the lower side of the writing surface 1a) is converted into a variable in terms of time. The propagation of the SAW within the writing panel 1 is cut off or inhibited only at the point specified by the input pen 8. By locating a particular one of the reflectors 35b (or the reflectors 36b) for which the detection signal output by the third receiving transducer 32 (or by the fourth receiving transducer 34) is attenuated or zero, the y-coordinate of the point on the writing panel 1 can be detected.

Accordingly, in the coordinate input device of the present embodiment, by using the transmitting transducers 21, 23, 31 and 33, the receiving transducers 22, 24, 32 and 34, and the reflectors 25a, 25b, 26a, 26b, 35a, 35b, 36a and 36b, the x-coordinate and the y-coordinate of a point on the writing panel 1 specified by the input pen 8 can be detected. The system control unit (CPU) 16 of the image display system 10 displays the input image on the display unit (PDP) 12 based on the x-coordinate and the y-coordinate of the point supplied from the coordinate input device of the present embodiment. It is possible for the coordinate input device of the present embodiment to provide accurate detection of the coordinates of the point on the writing panel 1 even when the writing panel 1 has an increased size, so that the coordinate input device can be suitably applied to the image display system 10 having the large-size display screen (PDP).

In the above-described embodiment, in addition to the functions of the previous embodiment of FIG. 3, the detection of the y-coordinate of a point on the writing panel 1 based on the propagation of the SAW within the writing panel 1 is carried out based on both the detection signal of the third receiving transducer 32 related to the upper half of the writing panel 1 and the detection signal of the fourth receiving transducer 34 related to the lower half of the writing panel 1. The propagation paths of the SAW in the y-axis directions on the writing panel 1 in order for the detection of the y-coordinate of the point are reduced so as to be less than half of the vertical width of the writing panel 1. The coordinate input device of the present embodiment is more effective than the first embodiment of FIG. 3 in preventing the overall period of the propagation of the SAW within the writing panel 1 from being excessively increased. Hence, even when the writing panel 1 has a further increased size, the coordinate input device of the present embodiment can provide accurate detection of the x-coordinate and the y-coordinate of the point on the writing panel 1 by using the transmitting transducers 21, 23, 31 and 33, the receiving transducers 22, 24, 32 and 34, and the reflectors 25a, 25b, 26a, 26b, 35a, 35b, 36a and 36b.

Figure 5:
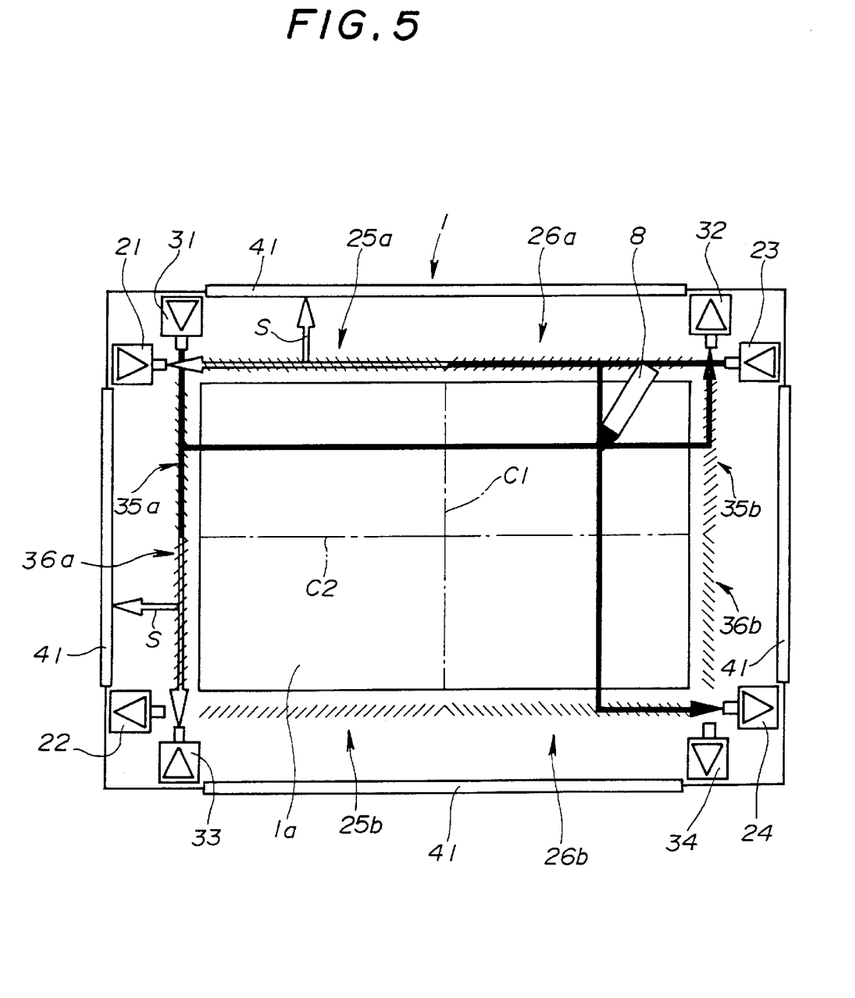
FIG. 5 is a diagram for explaining a third embodiment of the coordinate input device of the present invention.

Next, FIG. 5 shows a third embodiment of the coordinate input device of the present invention. In FIG. 5, the elements which are the same as corresponding elements in FIG. 4 are designated by the same reference numerals, and a description thereof will be omitted.

Similar to the first embodiment of FIG. 3, the coordinate input device of the present embodiment is incorporated into the image display system 10 as shown in FIGS. 1 and 2, and the image display system 10 is configured with the coordinate input device of the present embodiment attached to the display unit 12.

As shown in FIG. 5, in the coordinate input device of the present embodiment, the transmitting transducers 21, 23, 31 and 33, the receiving transducers 22, 24, 32 and 34, and the reflectors 25a, 25b, 26a, 26b, 35a, 35b, 36a and 36b are provided. These elements of the present embodiment are essentially the same as corresponding elements of the second embodiment of FIG. 4.

Further, in the coordinate input device of the present embodiment, as shown in FIG. 5, four damping plates 41 of a rubber material are provided at four peripheral edges of the writing panel 1. The rubber material of the damping plates 41 may be the same as that of the leading edge of the input pen 8. The damping plates 41 are placed outside the first and second TX reflectors 25a and 26a, outside the first and second RX reflectors 25b and 26b, outside the third and fourth TX reflectors 35a and 36a, and outside the third and fourth RX reflectors 35b and 36b, respectively. The damping plates 41 are provided for damping the outwardly reflected SAW from the reflectors on one of the four sides of the writing surface 1a to prevent the outwardly reflected SAW from being reflected to one of the receiving transducers opposite to the receiving transducer related to the reflectors.

The damping plates 41 at the four peripheral edges of the writing panel 1 have a substantially identical function. Hence, only the damping plate 41 at the upper peripheral edge of the writing panel 1 will now be described and a duplicate description of the other damping plates 41 will be omitted for the sake of simplicity of description.

While the SAW from the transducer 21 are reflected by the reflectors 25a, the SAW from the transducer 23, which confronts the transducer 21 via the writing panel 1, are partially reflected by the reflectors 25a in the outward directions. The outwardly reflected SAW are propagated sideways outside the writing surface 1a as indicated by an arrow "S" in FIG. 5. The damping plate 41 is provided at the upper peripheral edge of the writing panel 1 for damping the outwardly reflected SAW from the reflectors 25a to prevent the further reflection of the SAW in the inward directions to the reflectors 25b.

In the coordinate input device of the present embodiment, the damping plates 41 effectively prevent the outwardly reflected SAW from the transmitting transducers from being received by another receiving transducer which is not related to the transmitting transducers. Hence, the coordinate input device of the present embodiment is effective in preventing the S/N ratio related to the receiving transducers from being lowered due to the conflict between the SAW from the related transducers and the SAW from the unrelated transducers.

Figure 6:
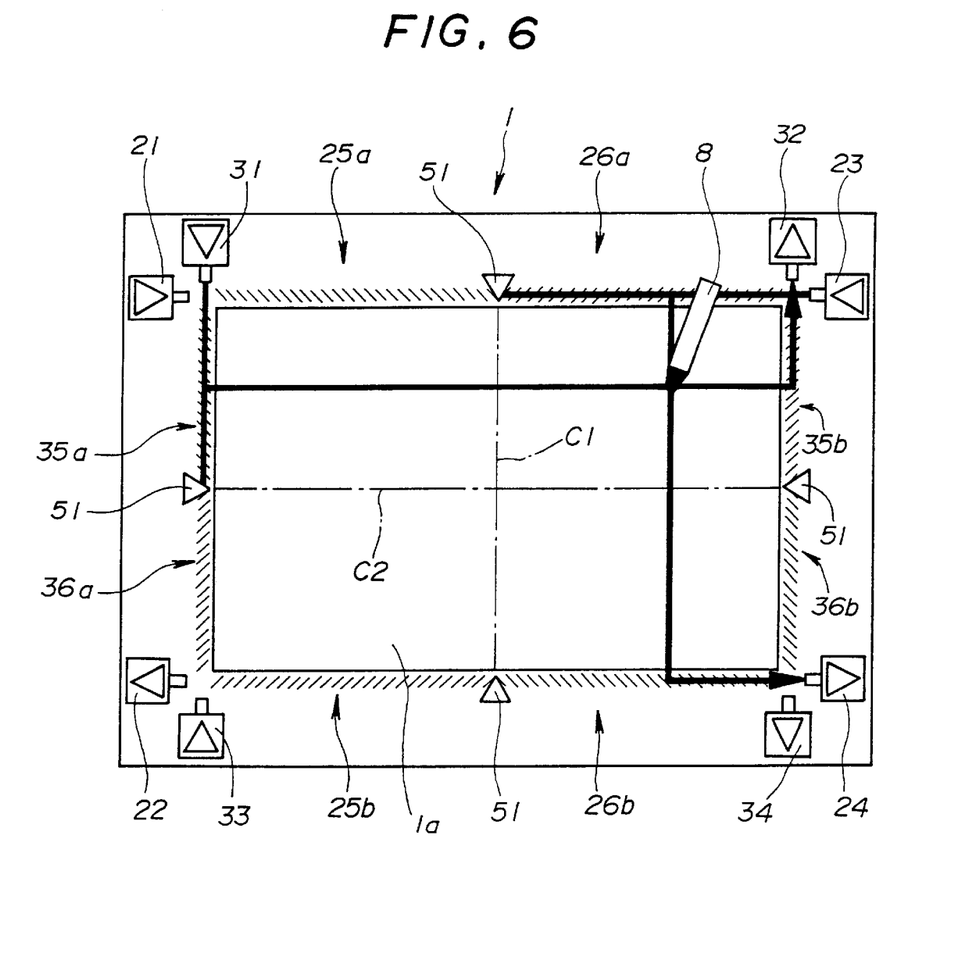
FIG. 6 is a diagram for explaining a fourth embodiment of the coordinate input device of the present invention.

Next, FIG. 6 shows a fourth embodiment of the coordinate input device of the present invention. In FIG. 6, the elements which are the same as corresponding elements in FIG. 5 are designated by the same reference numerals, and a description thereof will be omitted.

Similar to the first embodiment of FIG. 3, the coordinate input device of the present embodiment is incorporated into the image display system 10 as shown in FIGS. 1 and 2, and the image display system 10 is configured with the coordinate input device of the present embodiment attached to the display unit 12.

As shown in FIG. 6, in the coordinate input device of the present embodiment, the transmitting transducers 21, 23, 31 and 33, the receiving transducers 22, 24, 32 and 34, and the reflectors 25a, 25b, 26a, 26b, 35a, 35b, 36a and 36b are provided. These elements of the present embodiment are essentially the same as corresponding elements of the second embodiment of FIG. 4.

Further, in the coordinate input device of the present embodiment, as shown in FIG. 6, four damping members 51 of a rubber material are provided at the central positions of the four sides of the writing surface 1a. The damping members 51 are smaller in size than the damping plates 41. The rubber material of the damping members 51 may be the same as that of the leading edge of the input pen 8. The damping members 51 are placed at the middle of the first and second TX reflectors 25a and 26a, the middle of the first and second RX reflectors 25b and 26b, the middle of the third and fourth TX reflectors 35a and 36a, and the middle of the third and fourth RX reflectors 35b and 36b, respectively. The damping members 51 are provided for damping the SAW from one of the transmitting transducers opposite to the related transmitting transducer, so as to prevent the SAW from being reflected in the outward directions.

The damping members 51 at the four central positions of the writing panel 1 have a substantially identical function. Hence, only the damping block 51 at the central position of the upper side of the writing surface 1a will now be described and a duplicate description of the other damping members 51 will be omitted for the sake of simplicity of description.

In the previous embodiment of FIG. 5, while the SAW from the transducer 21 are reflected by the reflectors 25a, the SAW from the transducer 23, which confronts the transducer 21 via the writing panel 1, are partially reflected by the reflectors 25a in the outward directions. In the present embodiment, the damping block 51 is provided at the central position of the upper side of the writing surface 1a for damping the SAW from the transducer 23 to prevent the SAW from the transducer 23 from being reflected by the reflectors 25a in the outward directions.

In the coordinate input device of the present embodiment, the damping members 51 effectively prevent the SAW from the unrelated transmitting transducers from being reflected by the reflectors in the outward directions. Hence, the coordinate input device of the present embodiment is effective in preventing the S/N ratio related to the receiving transducers from being lowered due to the conflict between the SAW from the related transducers and the SAW from the unrelated transducers while the damping members 51 which are smaller in size than the damping plates 41 can be used.

As described above, it is possible for the coordinate input device of the present invention to provide accurate detection of the x-coordinate and the y-coordinate of a point on the writing panel 1 even when the writing panel 1 has an increased size, so that the coordinate input device can be suitably applied to the image display system 10 having the large-size display screen (PDP).

Further, the present invention is not limited to the above-described embodiments, and variations and modifications may be made without departing from the scope of the present invention.

The present invention is based on Japanese priority application No. 9-186118, filed on Jul. 11, 1997, the entire contents of which are hereby incorporated by reference.

What is claimed is:

1. A coordinate input device comprising:
   a writing panel including a writing surface having two vertical sides and two horizontal
   a plurality of transmitting units for transmitting surface acoustic waves SAW to propagate the SAW within the writing panel in one of a vertical direction and a horizontal direction through reflection;
   a plurality of receiving units for receiving the SAW from the plurality of transmitting units through reflection, and for outputting detection signals in response to the received SAW, so that coordinates of a specified point on the writing panel are detected based on the detection signals; and
   a plurality of reflectors provided on the four sides of the writing surface for reflecting the SAW from the transmitting units inwardly to the writing panel and for reflecting the reflected SAW to the receiving units,
   wherein the plurality of reflectors, the plurality of transmitting units, and the plurality of receiving units are configured to output the detection signals with respect to both the vertical direction and the horizontal direction for each of the plurality of subdivision surfaces of the writing panel and the reflectors on at least one of the vertical sides and the horizontal sides are symmetrically placed about a predetermined line of symmetry of the writing panel and halves of said reflectors are arrayed at mutually opposite supplementary angles to said at least one of the vertical sides and the horizontal sides.

2. The coordinate input device according to claim 1, wherein the plurality of reflectors include:
   first transmitting reflectors and first receiving reflectors provided on two opposing sides of the writing surface along a first half of the writing surface; and
   second transmitting reflectors and second receiving reflectors provided on the opposing sides of the writing surface along a second half of the writing surface,
   the plurality of transmitting units including:
   a first transmitting unit for transmitting the SAW to the first transmitting reflectors; and a second transmitting unit for transmitting the SAW to the second transmitting reflectors, the plurality of receiving units including:
a first receiving unit for receiving the SAW from the first receiving reflectors; and
a second receiving unit for receiving the SAW from the second receiving reflectors,
wherein the first transmitting reflectors and the second transmitting reflectors are arrayed at a first supplementary angle and at a second supplementary angle, and the first receiving reflectors and the second receiving reflectors are arrayed at the second supplementary angle and at the first supplementary angle.

3. The coordinate input device according to claim 2, wherein the first transmitting reflectors reflect the SAW from the first transmitting unit to the first half of the writing surface and the first receiving reflectors reflect the SAW reflected by the first transmitting reflectors to the first receiving unit, and wherein the second transmitting reflectors reflect the SAW from the second transmitting unit to the second half of the writing surface and the second receiving reflectors reflect the SAW reflected by the second transmitting reflectors to the second receiving unit.

4. The coordinate input device according to claim 2, wherein the plurality of transmitting units and the plurality of receiving units are provided on the writing panel so as to prevent the first receiving unit from receiving the SAW from the second transmitting unit, and to prevent the second receiving unit from receiving the SAW from the first transmitting unit.

5. The coordinate input device according to claim 2, wherein the plurality of transmitting units and the plurality of receiving units are provided on the writing panel such that the first transmitting unit and the second receiving unit do not confront with each other via the writing surface, and wherein the second transmitting unit and the first receiving unit do not confront with each other via the writing surface.

6. The coordinate input device according to claim 1, wherein the plurality of reflectors are symmetrically placed about a vertical center line of the writing panel.

7. The coordinate input device according to claim 1, wherein the plurality of reflectors are symmetrically placed about both a vertical center line of the writing panel and a horizontal center line of the writing panel.

8. The coordinate input device according to claim 1, further comprising a damping member, provided at each of four peripheral edges of the writing panel, for damping SAW which are outwardly reflected by the reflectors on a corresponding one of the four sides of the writing surface, so as to prevent the outwardly reflected SAW from being reflected to the receiving units other than a corresponding receiving unit related to said reflectors.

9. The coordinate input device according to claim 8, wherein the plurality of reflectors are symmetrically placed about both a vertical center line of the writing panel and a horizontal center line of the writing panel.

10. The coordinate input device according to claim 1, further comprising a damping member, provided at a central position of the reflectors on each of the four sides of the writing surface, for damping the SAW from the transmitting units other than a corresponding transmitting unit related to said reflectors.

11. The coordinate input device according to claim 10, wherein the plurality of reflectors are symmetrically placed about both a vertical center line of the writing panel and a horizontal center line of the writing panel.

12. The coordinate input device according to claim 2, wherein the plurality of reflectors further include third transmitting reflectors and third receiving reflectors provided on the vertical sides of the writing surface along a first half of a shorter length of the writing surface, and fourth transmitting reflectors and fourth receiving reflectors provided on the vertical sides of the writing surface along a second half of the shorter length of the writing surface,
wherein the plurality of transmitting units further include a third transmitting unit for transmitting the SAW to the third transmitting reflectors and a fourth transmitting unit for transmitting the SAW to the fourth transmitting reflectors, and the plurality of receiving units further include a third receiving unit for receiving the SAW from the third receiving reflectors and a fourth receiving unit for receiving the SAW from the fourth receiving reflectors,
wherein the third transmitting reflectors and the fourth transmitting reflectors are arrayed at the second supplementary angle and at the first supplementary angle and symmetrically placed about a horizontal center line of the writing panel, and the third receiving reflectors and the fourth receiving reflectors are arrayed at the first supplementary angle and at the second supplementary angle and symmetrically placed about the horizontal center line of the writing panel.

13. The coordinate input device according to claim 12, wherein the plurality of reflectors are provided on the writing panel such that the third transmitting reflectors reflect the SAW from the third transmitting unit in inward directions to the first half of the shorter length of the writing surface and the third receiving reflectors reflect the inwardly reflected SAW from the third transmitting reflectors to the third receiving unit.

14. The coordinate input device according to claim 13, wherein the fourth transmitting reflectors reflect the SAW from the fourth transmitting unit in inward directions to the second half of the shorter length of the writing surface and the fourth receiving reflectors reflect the inwardly reflected SAW from the fourth transmitting reflectors to the fourth receiving unit.

15. The coordinate input device according to claim 1, wherein the writing panel is transparent and covers a display screen of an image display system.

16. An image display system comprising:
a transparent writing panel covering a display screen of the image display system, the writing panel including a writing surface having two vertical sides and two horizontal sides, the writing surface being divided into a plurality of subdivision surfaces.
a plurality of transmitting units for transmitting surface acoustic waves SAW to propagate the SAW within the writing panel in one of a vertical direction and a horizontal direction through reflection;
a plurality of receiving units for receiving the SAW from the plurality of transmitting units through reflection, and for outputting detection signals in response to the received SAW;
a plurality of reflectors provided on the four sides of the writing surface for reflecting the SAW from the transmitting units inwardly to the writing panel and for reflecting the reflected SAW to the receiving units; and
a control unit for detecting coordinates of a specified point on the writing panel based on the detection signals from the plurality of receiving units,
wherein the plurality of reflectors, the plurality of transmitting units, and the plurality of receiving units are configured to output the detection signals with respect to both the vertical direction and the horizontal direction for each of the plurality of subdivision surfaces of the writing panel and the reflectors on at least one of the vertical sides and the horizontal sides are symmetrically placed about a predetermined line of symmetry of the writing panel and halves of said reflectors are arrayed at mutually opposite supplementary angles to said at least one of the vertical sides and the horizontal sides.

* * * * *